US011935282B2

(12) United States Patent
Iwasawa et al.

(10) Patent No.: US 11,935,282 B2
(45) Date of Patent: Mar. 19, 2024

(54) SERVER OF CROP GROWTH STAGE DETERMINATION SYSTEM, GROWTH STAGE DETERMINATION METHOD, AND STORAGE MEDIUM STORING PROGRAM

(71) Applicants: NTT DATA CCS CORPORATION, Tokyo (JP); Norio Iwasawa, Aizuwakamatsu (JP)

(72) Inventors: Norio Iwasawa, Aizuwakamatsu (JP); Aritoshi Mio, Tokyo (JP); Seiichi Hara, Tokyo (JP); Hiroto Shimojo, Tokyo (JP); Hiroshi Takemoto, Tokyo (JP)

(73) Assignees: NTT DATA CCS CORPORATION, Tokyo (JP); Norio Iwasawa, Aizuwakamatsu (JP)

( * ) Notice: Subject to any disclaimer, the term of this patent is extended or adjusted under 35 U.S.C. 154(b) by 276 days.

(21) Appl. No.: 17/186,305

(22) Filed: Feb. 26, 2021

(65) Prior Publication Data
US 2021/0183045 A1 Jun. 17, 2021

Related U.S. Application Data

(63) Continuation of application No. PCT/JP2018/032066, filed on Aug. 30, 2018.

(51) Int. Cl.
*G06V 10/82* (2022.01)
*A01G 7/00* (2006.01)
(Continued)

(52) U.S. Cl.
CPC ............. *G06V 10/82* (2022.01); *G06F 18/22* (2023.01); *G06T 7/0002* (2013.01); *G06T 7/11* (2017.01);
(Continued)

(58) Field of Classification Search
CPC ...... G06Q 50/02; G06V 10/764; G06V 10/82; G06V 10/188; G06T 7/0002; G06T 7/11;
(Continued)

(56) References Cited

U.S. PATENT DOCUMENTS

2014/0176705 A1  6/2014 Ibamoto

FOREIGN PATENT DOCUMENTS

AU     2003201830 B2 *  5/2004  ........... A01C 21/007
CN        104899255 A    9/2015
(Continued)

OTHER PUBLICATIONS

Guo, Wei, Tokihiro Fukatsu, and Seishi Ninomiya. "Automated characterization of flowering dynamics in rice using field-acquired time-series RGB images." Plant methods 11 (2015): 1-15. (Year: 2015).*

(Continued)

*Primary Examiner* — Vu Le
*Assistant Examiner* — Tracy Mangialaschi
(74) *Attorney, Agent, or Firm* — Oblon, McClelland, Maier & Neustadt, L.L.P.

(57) ABSTRACT

A server of a crop growth stage determination system includes a processor. The processor inputs first images obtained by image capturing crops in a manner such that crop shapes are extractable. The Processor inputs growth stages each indicating a level of physiological growth of the crops for each of the first images. The processor constructs a learned model by performing deep learning to associate images of the crops and growth stages of the crops based on the input first images and the input growth stage. The processor inputs a second image obtained by image capturing crops a growth stage of which is unknown, in a manner such that crop-shapes are extractable. The processor determines the growth stage for the input second image based on
(Continued)

the learned model. The processor outputs the determined growth stage.

10 Claims, 6 Drawing Sheets

(51) Int. Cl.
    *G06F 18/22*     (2023.01)
    *G06T 7/00*     (2017.01)
    *G06T 7/11*     (2017.01)
    *G06V 10/764*     (2022.01)
    *G06V 20/10*     (2022.01)

(52) U.S. Cl.
    CPC .......... *G06V 10/764* (2022.01); *G06V 20/188* (2022.01); *A01G 7/00* (2013.01); *G06T 2207/20081* (2013.01); *G06T 2207/30188* (2013.01)

(58) Field of Classification Search
    CPC . G06T 2207/30188; G06T 2207/20081; G06F 18/22; A01G 7/00
    See application file for complete search history.

(56) References Cited

FOREIGN PATENT DOCUMENTS

| | | | | |
|---|---|---|---|---|
| CN | 107563389 A | | 1/2018 | |
| CN | 108319894 A | | 7/2018 | |
| CN | 108416353 A | * | 8/2018 | ............. G06K 9/342 |
| CN | 108982377 A | * | 12/2018 | |
| EP | 3 279 831 A1 | | 2/2018 | |
| JP | 2006-139418 A | | 6/2006 | |
| JP | 2013-111078 A | | 6/2013 | |
| JP | 2016-101117 A | | 6/2016 | |
| JP | 2016-168046 A | | 9/2016 | |
| JP | 6267841 B1 | | 1/2018 | |
| KR | 20130005540 A | | 1/2013 | |
| KR | 101830056 B1 | | 2/2018 | |
| WO | WO 2013/030964 A1 | | 3/2013 | |

OTHER PUBLICATIONS

Dyrmann, Mads, and Rasmus Nyholm Jørgensen. "RoboWeedSupport: weed recognition for reduction of herbicide consumption." Precision agriculture'15. Wageningen Academic Publishers, 2015. 259-269. (Year: 2015).*

Decision to Grant dated Nov. 26, 2019 in Japanese Patent Application No. 2019-561334 (with unedited computer generated English translation), 5 pages.

International Preliminary Report on Patentability and Written Opinion dated Mar. 11, 2021 in PCT/JP2018/032066 (submitting English translation only), 8 pages.

International Search report dated Oct. 9, 2018 in PCT/JP2018/032066, filed on Aug. 30, 2018.

Ito, et al. "Applying a Drone for Agriculture" IEICE Technical report, vol. 117, No. 52, 2017, 8 pages.

Goto et al. "Diagnostic Approach to Growth of Paddy Rice Using Digital Camera Image Analysis", Tohoku Agricultural Research, vol. 57, 2004, 2 pages.

Office Action dated Feb. 3, 2023, in corresponding Korean Patent Application No. 10-2021-7005496 (with English Translation), 10 pages.

Chinese Office Action dated Sep. 25, 2023, issued in Chinese Patent Application No. 201880096910.0 (with English translation).

Zhang Yunde et al. "Maize growth period recognition based on deep convolutional feature." Electronic Measurement Technology, vol. 41, Issue 16, pp. 79-84. Aug. 13, 2008.

Duan Lingfeng et al. "Field rice panicle segmentation based on deep full convolutional neural network." Transactions of the Chinese Society of Agricultural Engineering, vol. 34, No. 12, pp. 202-207. Jun. 30, 2018.

* cited by examiner

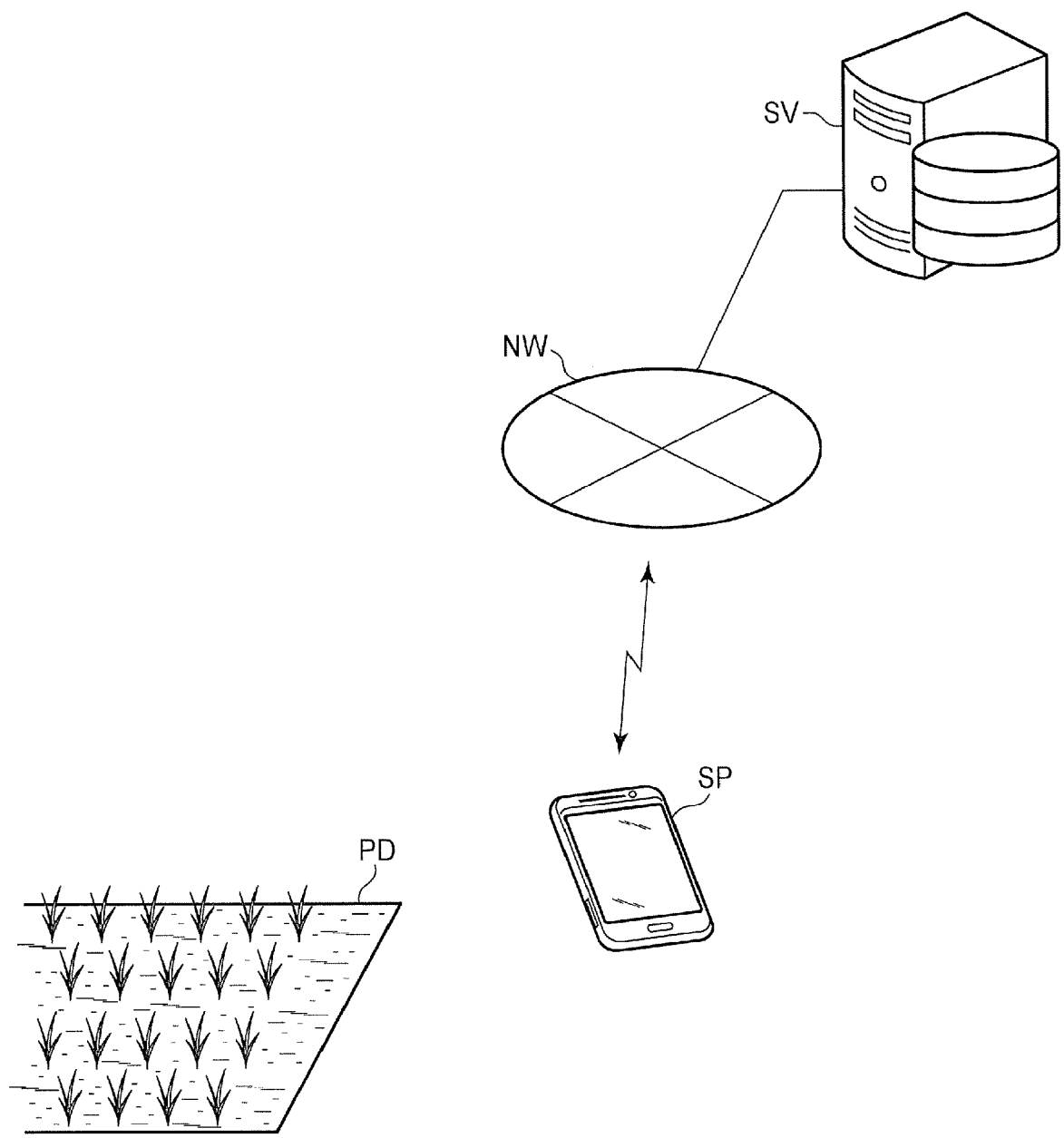
F I G. 1

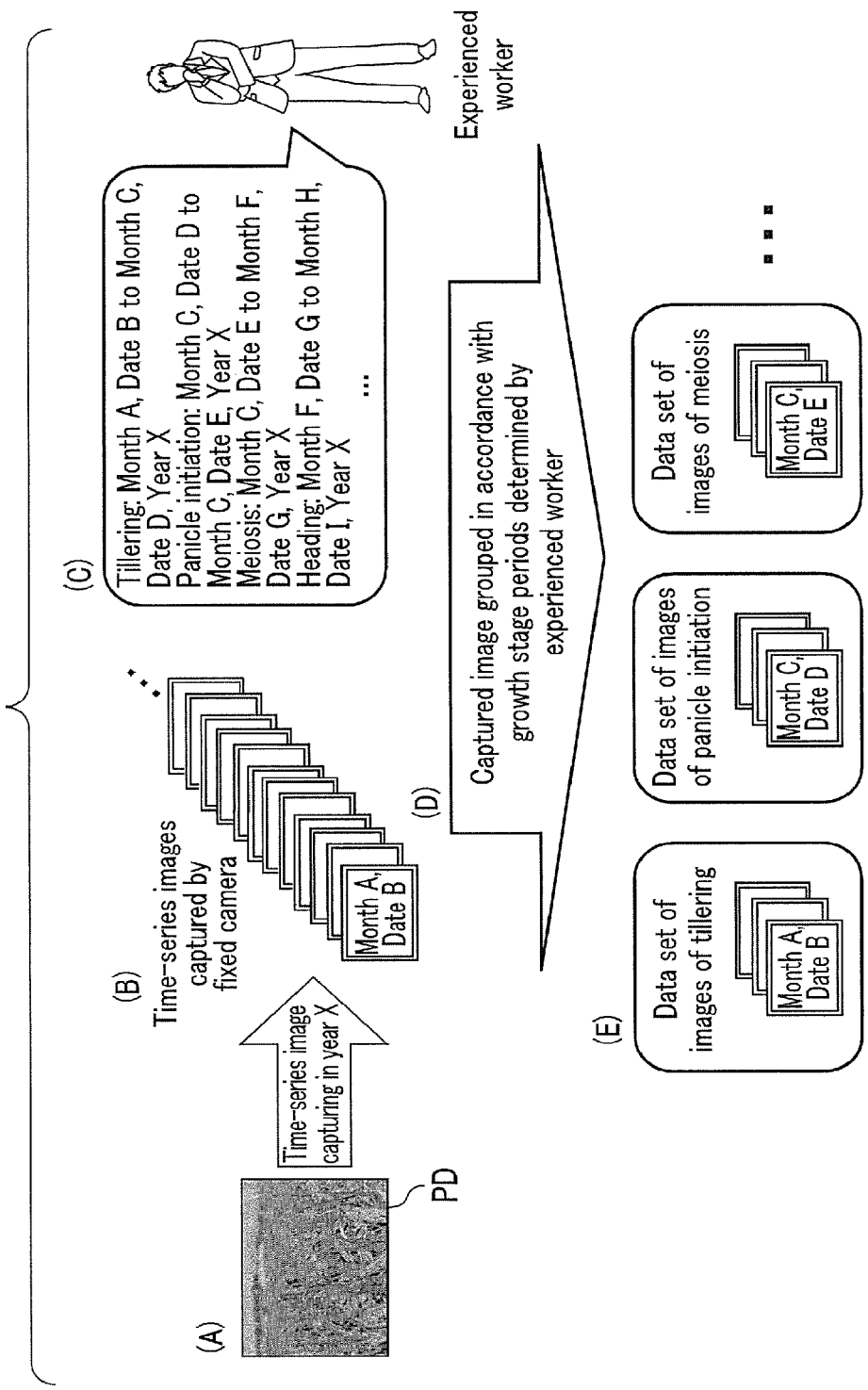
F I G. 4

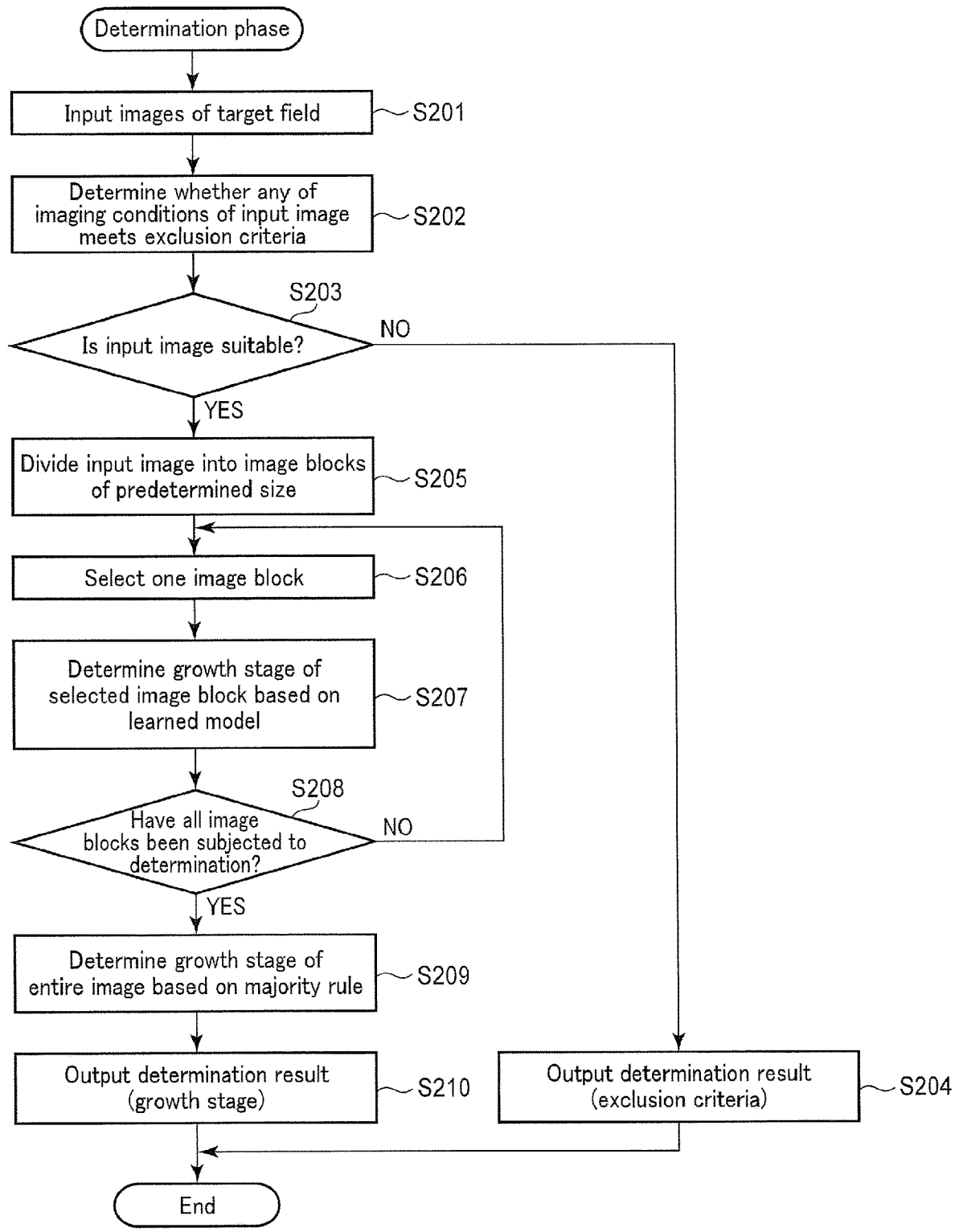
F I G. 5

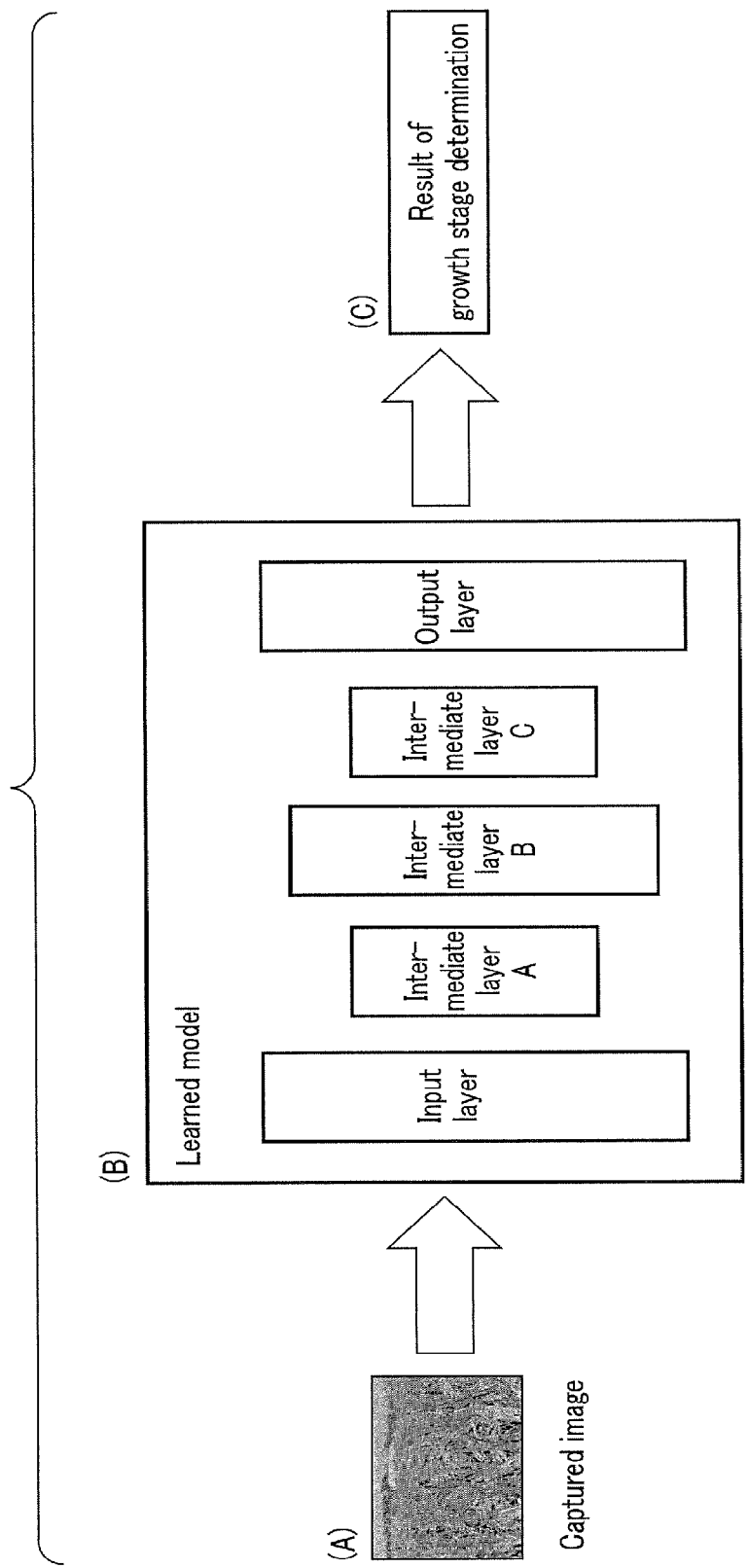
F I G. 6

SERVER OF CROP GROWTH STAGE DETERMINATION SYSTEM, GROWTH STAGE DETERMINATION METHOD, AND STORAGE MEDIUM STORING PROGRAM

CROSS-REFERENCE TO RELATED APPLICATIONS

This application is a Continuation Application of PCT Application No. PCT/JP2018/032066, filed Aug. 30, 2018, the entire contents of which are incorporated herein by reference.

FIELD

The present embodiment relates to a server of a crop growth stage determination system suitable for accurately keeping track of a growth state of crops, a growth stage determination method, and a storage medium storing a program.

BACKGROUND

In agricultural business, particularly in the field of land-intensive farming crops such as chief dietary staples including paddy rice, farmlands are rapidly shifting toward consolidation into large-scale management entities due to changes in the industrial structure against the backdrop of aging. In the long term, such a trend toward farmland consolidation seems to be intensifying. If the scale of cultivation per management entity reaches or exceeds a certain level as a result of the farmland consolidation, the judgment and management required will exceed the human capability of information processing with the existing cultivation management method, which will hamper the appropriate judgment and management. As a result, there will be more cases in which the quality and yield of products are lowered by missing crucial timings of tasks or the like, decreasing earnings and profits. Currently, such cases pose management issues.

A key to crop cultivation is to accurately determine the growth stages of the crops and appropriately manage watering and fertilizing. Crops have various growth stages, including germination, vegetative growth, reproductive growth, flowering, and ripening. Agricultural workers carry out appropriate cultivation management while keeping track of these stages every day.

In paddy rice cultivation, for instance, judgment of growth stages is one of the essential techniques of basic management. In particular, the judgment of the timing of fertilization (panicle fertilization) based on panicle initiation, which is the judgment of one of the growth stages, directly affects the yield and quality of raw rice.

In order to accurately judge the growth stage, the worker needs to make the daily rounds of the paddy field, sensing any changes from the previous day, by directly taking samples from the plants to cut apart and examine in detail. As more farmlands are consolidated, however, it is extremely difficult for workers burdened with so much work to do to thoroughly cover all of the extensive and remote farmlands to determine the growth stage of the crops based on panicle initiation or the like.

Judgment of panicle initiation is especially difficult for those who are inexperienced, with a panicle being covered by a leaf sheath and invisible from the outside, and the technique is difficult to verbally pass down. This also poses an issue of personnel and time costs for teaching and passing down the technique.

When the paddy rice growth is considered to involve five stages, namely (1) tillering, (2) panicle initiation, (3) meiosis, (4) heading, and (5) ripening, the stages of (4) heading and (5) ripening can be relatively apparent from outer changes.

For this reason, as in the technique described in Jpn. Pat. Appln. KOKAI Publication No. 2013-111078, a system has been proposed in which a reference image is prepared so that a captured inspection image can be compared with the reference image to carry out judgment. In addition, a system has been proposed in which the growth state is judged by estimating the plant height and the number of stems from the number of pixels of rice plants in an image, as in the technique described in "Paddy Rice Growth Diagnosis Technology Using RGB Processing of Digital Camera Image" (Katsunori Goto et al., Tohoku Agricultural Research, December 2004, No. 57, pp. 59-60).

SUMMARY

In the meantime, (2) panicle initiation and (3) meiosis are important work stages that most affect the yield and quality of the crops. The early stage of (2) panicle initiation, however, is practically impossible at the moment for a person other than those who are experienced to distinguish. Even for a person of experience, it is necessary to dissect a panicle under a microscope in order to reliably perform the examination, which involves an extremely high-difficulty task. The judgment of (3) meiosis also requires destructive inspection by peeling the panicle portion by hand or cutting it open with a box cutter to visually examine the growth state. Since an enormous amount of labor is required to check all the farm fields, it is not practical to check the state through destructive inspection on a large-scale farm.

For this reason, without actually performing judgment of panicle initiation or the like, tasks are often conducted with their appropriate timings missed. This is considered to be a major factor that impairs yield and quality.

The present embodiment has been conceived in view of the above circumstances. The object of the present embodiment is to provide a server of a crop growth stage determination system capable of easily and accurately determining the growth state of crops in a non-destructive manner, as well as a growth stage determination method and a storage medium storing a program.

According to an aspect, a server of a crop growth stage determination system includes a processor. The processor inputs first images obtained by image capturing crops in a manner such that crop shapes are extractable. The Processor inputs growth stages each indicating a level of physiological growth of the crops for each of the first images. The processor constructs a learned model by performing deep learning to associate images of the crops and growth stages of the crops based on the input first images and the input growth stage. The processor inputs a second image obtained by image capturing crops a growth stage of which is unknown, in a manner such that crop-shapes are extractable. The processor determines the growth stage for the input second image based on the learned model. The processor outputs the determined growth stage.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute apart of the specification, illustrate embodiments, and together with the general description given above and the detailed description of the embodiments given below, serve to explain the principles.

FIG. 1 is a diagram showing the overall configuration of a growth stage determination system according to an embodiment.

FIG. 4 is a diagram for explaining the outline of the processing operations executed in FIG. 3 according to the embodiment.

FIG. 5 is a flowchart showing a series of processing operations executed in a determination phase according to the embodiment.

FIG. 6 is a diagram for explaining the outline of the processing operations executed in FIG. 5 according to the embodiment.

DETAILED DESCRIPTION

The present embodiment will be described in detail below, in which the present embodiment is applied to a growth stage determination system for determining a growth stage of paddy rice, with reference to the drawings.

FIG. 1 is a diagram showing the configuration of the entire growth stage determination system according to the embodiment. In this drawing, an image of a paddy field PD for which the growth stage is to be determined is captured by a camera function of a smartphone SP that is carried by a user (not shown).

In the smartphone SP, an application program designed specifically for this system is installed in advance. When an image of rice plants in a paddy field is captured with this application program activated on the smartphone SP, in a composition indicated by guidelines displayed on the display screen, data of a still image of the rice plants obtained by image capturing is acquired as determination target image information.

The smartphone SP is connected to a server SV that determines a growth stage, via a network NW including a base station of a mobile phone network and the Internet.

The means for capturing the image of the determination target is not limited to the smartphone SP carried by the user. For instance, images may be periodically captured by a fixed digital camera using its time-lapse function and may be transmitted to the server SV.

The server SV removes color components from the image information transmitted from the smartphone SP based on the stored learned model to obtain gray-scale image information including luminance components only. Thereafter, the server SV determines the growth stage of the rice plants in the gray-scale image information, and returns the determination result to the smartphone SP.

In the actual operation, in addition to the growth stage shown on the smartphone SP, the number of days passed in the current growth stage, the number of days before reaching the next growth stage, or the like may be presented on the smartphone SP based on the history, accumulated in the server SV, of the previous growth stages in the farm field associated with the user.

Figure 2:
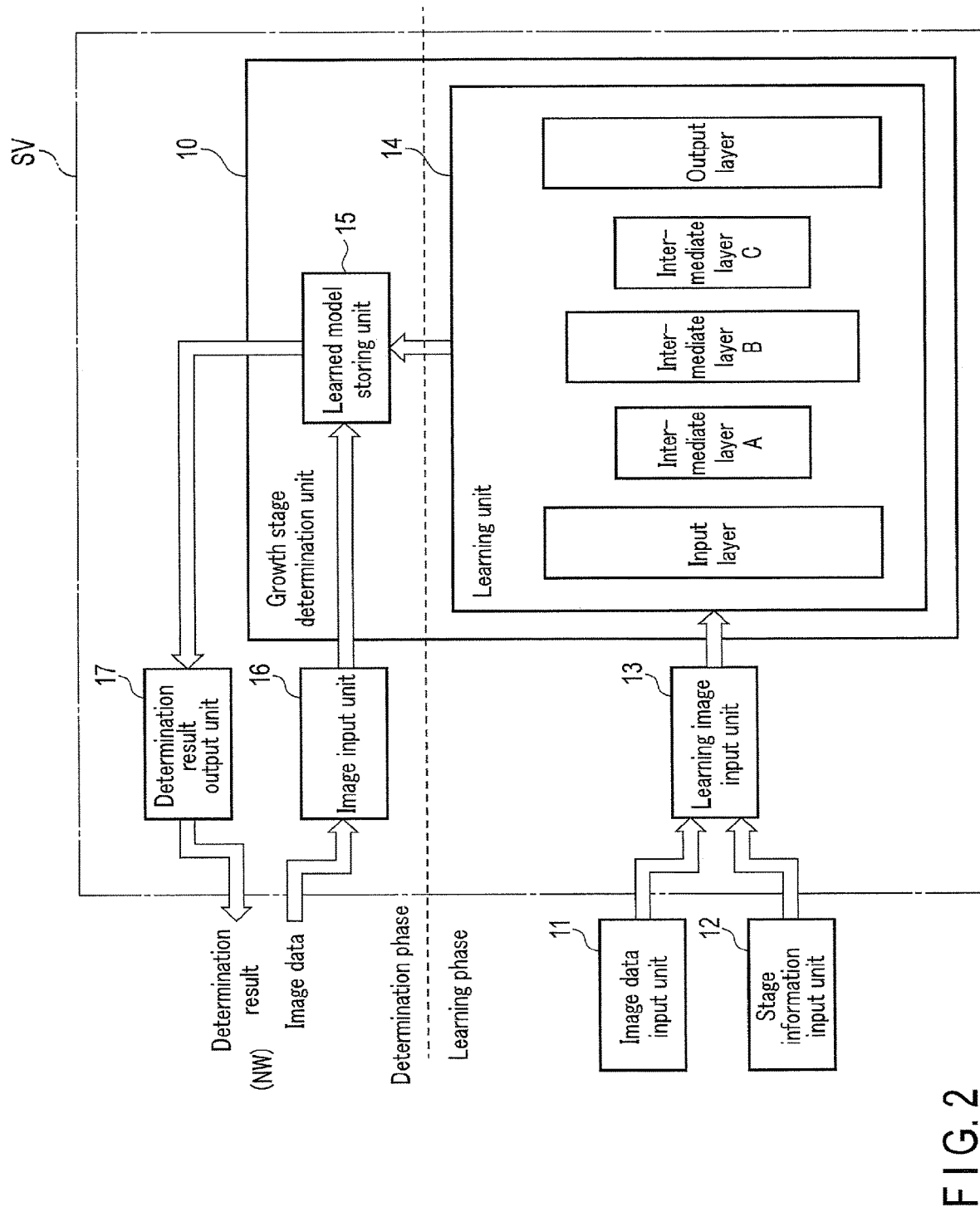
FIG. 2 is a block diagram showing a functional configuration of a server according to the embodiment.

FIG. 2 is a block diagram showing a functional configuration of a computer program executed by the processor of the server SV.

The server SV includes a growth stage determination unit 10 as a main structural component, and this growth stage determination unit 10 is arranged across two regions of a learning phase and a determination phase.

In the learning phase, data of images of rice plants of different growth stages is input by an image data input unit 11 to construct a basic learning model. In the meantime, growth stage information associated with data of each image is input through the stage information input unit 12 by a person of experience in determining the growth stage.

The image data of the rice plants input from the image data input unit 11 and the growth stage information associated with the image data input from the stage information input unit 12 are received by the learning image input unit 13, associated with each other, and input to the learning unit 14 of the growth stage determination unit 10.

The learning unit 14 performs deep learning using a convolutional neural network (CNN) having, for example, five layers, namely an input layer, an intermediate layer A, an intermediate layer B, an intermediate layer C, and an output layer, thereby executing learning using a large number of sets of input image data and growth stage information as supervisory data.

During the learning, various parameters are changed and set through trial and error to generate an optimal learned model. When the model is determined to be satisfactorily suitable for practical use, a learned model, which is the acquired neural network, is achieved and held in a learned model storing unit 15 of the determination phase.

In the determination phase of the growth stage determination unit 10, when the image data of the rice plants is input from an image input unit 16 via the network NW, the growth stage for this image data is determined based on the learned model stored in the learned model storing unit 15. The information of the growth stage is obtained as the determination result, and the obtained information of the growth stage is returned by a determination result output unit 17 to the smartphone SP, that has transmitted this image data, through the network NW.

Next, the operation of the above embodiment will be described.

The image capturing conditions of the image data to be input into the learning phase of the server SV are determined in such a manner as to improve the learning accuracy, for example, by setting a fixed point that serves as an observation position for a farm field of an image capturing target of the year, and determining an image capturing time period in which sufficient sunlight can be caught under fine weather throughout the season, for example, between 11 a.m. and 1 p.m.

To process the image data input into the learning phase and the determination phase of the server SV, the captured color image is transformed to a gray-scale image containing luminance components only in order to eliminate the influence of color components of the sunlight (morning glow, etc.) of the image capturing time period, the fertilizer and the like.

Furthermore, exclusion criteria regarding sunlight exposure and the bent-over state of rice plants under wind may be predetermined so as to restrict the input of image data that may prolong the learning time or lower the accuracy of the learning data, for example when sunlight exposure is insufficient due to rainy weather, or when the rice plants are considerably bent or blurred in still images under strong wind.

First, processing in a learning phase will be described, in which image data obtained by capturing images of paddy rice plants of every growth stage in a paddy field PD is sequentially input together with the information indicating the corresponding growth stage, and deep learning is performed based on the input data.

Figure 3:
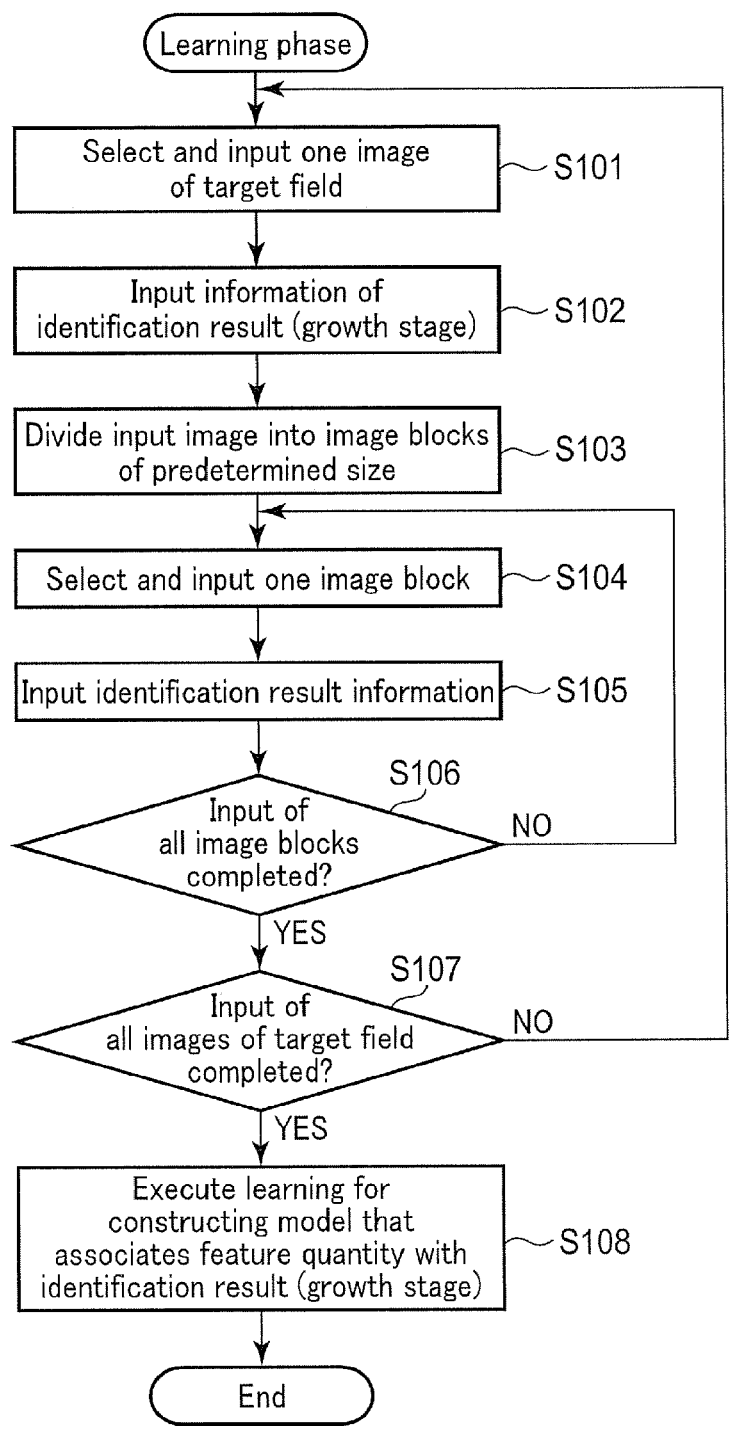
FIG. 3 is a flowchart showing a series of processing operations executed in the learning phase according to the embodiment.

FIG. 3 is a flowchart showing a series of processing operations executed in the learning phase by the growth stage determination unit 10 of the server SV. First, one image of the image data of the target farm field that has not yet been input is selected and input from the image data input unit 11 (step S101), and the information of the identification result of the growth stage corresponding to this image is input by a person of experience through the stage information input unit 12 (step S102). The image data contains data of the image capturing date and time as part of its supplementary data.

In the server SV, the learning image input unit 13 receives this image data and the information of the growth stage in association with each other, and divides the input image data into image blocks of a predetermined size (step S103).

The size of the divided data is preferably determined to be large enough to distinguish the shapes and spacing of rice plants in an image. The division may be performed such that the peripheral portions of an image block overlap their adjacent image blocks at an appropriate overlap ratio.

The growth stage determination unit 10 of the server SV selects one of the divided image blocks and inputs the selected image block to the learning unit 14 (step S104), and also inputs to the learning unit 14 the information of the identification result of the growth stage corresponding to the image data, which has been input immediately before at step S102 (step S105).

Thereafter, it is determined whether or not all the image blocks obtained by dividing the image data have been input to the learning unit 14 (step S106). If it is determined that input of all the divided image blocks together with the information of their identification results of the growth stage is not yet completed (no at step S106), the growth stage determination unit 10 returns to the processing of step S104 and onward to continue the same input processing for the image blocks that have not yet been input.

The processing of steps S104 through S106 is thereby repeated, and when it is determined that all the image blocks obtained by dividing the image data item have been input together with the information of their identification results of the growth stage (yes at step S106), the growth stage determination unit 10 determines whether or not all the image data sets of the target farm field have been input (step S107).

If the growth stage determination unit 10 determines that the input of all the image data sets of the target farm field has not been completed and there is an image data set that has not yet been input (no at step S107), the growth stage determination unit 10 returns to the above processing of step S101 and onward to continue the same input processing for image data sets that have not yet been input.

In the above manner, the processing operations of steps S101 through S107 are repeated, and when it is determined, after all the image data is input together with the result of identifying its growth stage, that the division of the image data into multiple image blocks of a predetermined size and input of these image blocks into the learning unit 14 has been completed (yes at step S107), the learning unit 14 executes deep learning with the CNN to construct a model for associating the feature quantities of images with the results of identifying the growth stages (step S108). The process in the learning phase is thereby completed.

FIG. 4 is a diagram for explaining the outline of the processing operations executed in FIG. 3. As shown in (B) of FIG. 4, image data containing a large number of images is acquired by performing time-series image capturing in the paddy field PD shown in (A) of FIG. 4 from the same position in the same time period of the year X. As shown in (C) of FIG. 4, a person of experience judges to input the period of each growth stage, with respect to the data of these images.

As shown in (D) of FIG. 4, based on the above input, the identification information of the growth stage is associated with the data of each image, and the resultant data is input to the learning unit 14.

The learning unit 14 labels the data of each image based on the identification information of the growth stage so that the image data can be grouped in accordance with the growth stage.

As a result of this grouping, as shown in (E) of FIG. 4, groups of image data for the tillering, panicle initiation, meiosis, heading, and ripening stages are input to the learning unit 14.

The learning unit 14 executes deep learning, using each group of image data as a data set to construct a learned model, with which feature information indicating features of paddy rice images at each growth stage is extracted. The constructed learned model is stored in the learned model storing unit 15.

Next, the process in the determination phase will be described, where image data of a target farm field, for which determination of a growth stage is requested, is input through the image input unit 16 when a learned model is stored in the learned model storing unit 15.

FIG. 5 is a flowchart showing a series of processing operations executed in the determination phase by the growth stage determination unit 10 of the server SV. First, the image data of a target farm field having an unknown growth stage that is sent from a user via a network NW is input through the image input unit 16 (step S201).

Here, the image data sent from the user is assumed to be gray-scale image data, in which only luminance components are contained with color components removed in advance by an application program of the smartphone SP on the user side.

The growth stage determination unit 10 determines whether or not the individual input images meet the exclusion criteria, based on whether or not the preset image capturing conditions are satisfied (step S202).

Specifically, the growth stage determination unit 10 individually determines whether or not the gray-scale image data satisfies a certain sunlight exposure condition, for example, based on whether or not the luminance level of the entire image reaches or exceeds a preset level, and whether or not the rice plants in the image are bent over under wind, based on the image processing including edge detection and contour extraction processing.

As a result of such determination, the growth stage determination unit 10 judges whether or not the input image data is suitable for the determination of the growth stage, based on whether or not any of the exclusion criteria is not met (step S203).

If the image is determined to be unsuitable, or in other words, if there is at least one exclusion criterion that is met (no at step S203), the growth stage determination unit 10 causes the determination result output unit 17 to output data of a guidance message indicating, as a result of the determination, that accurate determination has failed to be made due to the exclusion criteria (including rainy or windy weather, solar altitude, camera angle, accuracy of the determination result, and the like), as a reply to the smartphone SP of the user who has sent the image data via the network NW (step S204). The process of FIG. 5 is thereby terminated.

If the input image data is determined at step S203 to be suitable for the determination of the growth stage (yes at step S203), the growth stage determination unit 10 divides the input image data into image blocks of a predetermined size (step S205).

The size of the divided data is preferably determined to be large enough to distinguish the shape and spacing of rice plants in an image. The division may be performed such that the peripheral portions of an image block overlap their adjacent image blocks at an appropriate overlap ratio. It is also desirable that this size be the same as the size of the divided image in the learning phase.

The growth stage determination unit 10 selects one of the divided image blocks (step S206), and determines the growth stage of the selected image block by using the learned model stored in the learned model storing unit 15 (step S207).

Next, the growth stage determination unit 10 determines whether or not the determination of all the image blocks has been completed, based on whether or not there is any image block which has not yet been subjected to the determination (step S208).

If it is determined that the determination of all the image blocks has not yet been completed (no at step S208), the growth stage determination unit 10 returns to the processing operations of step S206 and onward, and executes the same processing.

In this manner, the processing operations of steps S206 through S208 are repeated, and the growth stage determination unit 10 determines the growth stage for each of the image blocks obtained by dividing the data of one image, based on the learned model stored in the learned model storing unit 15.

When the growth stage determination unit 10 determines that the determination of the growth stage has been completed for all the image blocks obtained by dividing the input image data (yes at step S208), the growth stage determination unit 10 determines, by a predetermined determination scheme, for example based on majority rule, the information of the growth stage represented in the majority of the determination results, as the determination result of the entire image data (step S209).

Specifically, for the determination of the growth stage of an image block, probabilities of being in the five growth stages may be calculated. The stage with the highest probability calculated is determined as the growth stage of the image block. The entire distribution of the probabilities may demonstrate variation, showing no significant bias, and therefore the determination may not be performed with high accuracy. For example, the probabilities of Stages 1, 2, 3, 4 and 5 may be 15%, 20%, 25%, 20%, and 20%, respectively. If this is the case, no determination can be made on this image block, and the image block will be excluded from the majority calculation.

In the above manner, the growth stage is determined in each of the image blocks, and based only on the results with higher accuracy, the majority rule is adopted for the entire image data. Thus, a two-step determination process for determining the growth stage at high accuracy can be realized.

The growth stage determination unit 10 causes the determination result output unit 17 to output, as a response, the obtained determination result that represents the information of the growth stage, to the smart phone SP of the user who has transmitted the image data through the network NW (step S210). The process of FIG. 5 is thereby terminated.

As the information of the growth stage returned to the user's smartphone SP as the determination result, image data may be created by adding the determination result of the entire image that represents the information of the growth stage to the side portion of the image data in which color-coded dots of the determination results of the growth stages of each divided image block are superimposed, or by presenting, together with the image data, the determination result totals of the growth stages as percentages based on the determination results of the divided image blocks.

If the same user continuously sends the images of the same farm field, image data may be created to include, based on the history of the determination results stored in the server SV, the number of days passed in the current stage expressed in the form of "n-th day of stage x", or the number of days counted down to the next estimated stage or to the timing suitable for top-dressing expressed in the form of "n more days to heading stage", and such image data may be returned to the user. Whether the image data is from the same user can be easily determined from the sender ID information of the image data. In addition, if the configuration is such that the user adds the GPS data to the image data and sends such image data, whether the image data is of the same farm field can also be easily determined.

In the processing of FIG. 5, the determination of the growth stage using the learned data is performed only when the imaging conditions regarding, for example, sunlight exposure and wind bending-over are satisfied. The determination of the growth stage, however, may be performed directly by skipping such pre-processing for the determination.

FIG. 6 is a diagram for explaining the outline of a series of processing operations executed in FIG. 5. As shown in (A) of FIG. 6, an image of the paddy field PD, for which determination of a growth stage is requested, is captured by the user on the smartphone SP and sent to the server SV via a network NW.

The application program executed on the smartphone SP when the user takes images may display, on the display showing the farm field with the camera function, a guide indicating the composition of image capturing, or more specifically, the side of a rice plant on the edge of the farm field and a row of the top portions of the rice ears aligned in the back of the front plant so that a highly accurate determination can be made by exploiting the learned results obtained on the server SV side.

Upon receipt of the image data from the user by the image input unit 16, the growth stage determination unit 10 determines the growth stage using the learned model stored in the learned model storing unit 15 as shown in (B) in FIG. 6.

As shown in (C) of FIG. 6, the server SV causes the determination result output unit 17 to return the information of the growth stage obtained as a result of the above, to the smartphone SP carried by the user via the network NW.

According to the present embodiment as described above in detail, it is possible to easily and accurately determine the growth state of crops in a non-destructive manner.

In addition, in the above-described embodiment, a paddy rice plant in the paddy field PD is particularly targeted for the determination of the growth stage, where the growth stages including the panicle initiation are determined. Thus, it is possible even for an inexperienced person to easily achieve a difficult task that requires exacting determination on a daily basis, including the case of a vast paddy field PD, with a technique using deep learning.

Furthermore, in the above-described embodiment, the image capturing conditions of the crops in the image data to be captured are set so that the input of the image data that does not satisfy the image capturing conditions can be excluded. Thus, the determination accuracy in the deep learning can be increased.

In the above-described embodiment, when an image of the determination target crops is captured, a guide is displayed so that the image can be captured in a certain composition in accordance with an application program installed in the smartphone SP. Thus, it is possible to prompt the user to capture an image of the crops suitable for the determination, and therefore a highly accurate operation can be expected.

Furthermore, in the above-described embodiment, the obtained image that has been divided into multiple image blocks having regions suitable for deep learning is subjected to the process. The growth stage is determined for each of the divided regions based on the learned model, and the growth stage of the entire image data is determined by combining the determination results of these regions. Thus, as a whole, it is possible to accurately determine the growth stage by absorbing individual differences in the growth stage of the crops divided into individual regions.

In the above-described embodiment, gray-scale image data containing only luminance components with color components removed from color image data is adopted as the image data to be dealt with in the learning phase and the determination phase. This can avoid deterioration in accuracy of learning and subsequent determination under the influence of changes in color components.

In place of the gray-scale image data, monochrome binary image data obtained by extracting only edges of the rice plants may be adopted. By using the binary image data, the amount of calculation can be greatly reduced, and the influence of scattering sunlight can be completely eliminated.

According to the present embodiment, the result of determining the growth stage of the crops is not the only result presented to the user who has requested the judgment. By using the history of the determination results for the same user in the same farm field in the past, the number of days passed in the current growth stage and the estimated number of days to the next growth stage can also be presented. Thus, a more practical system can be provided, with which the timings of top-dressing and herbicide application can be easily ascertained.

As additional information regarding the present embodiment, an experiment was conducted in which image data of a rice cultivar "Koshihikari" was acquired throughout the season, and the growth stage was determined under the same imaging conditions in the next season. As a result of this experiment, an extremely accurate and favorable outcome was attained.

The present invention does not limit the cultivar of paddy rice to "Koshihikari", nor does it limit the crop to paddy rice. In addition to paddy rice, the present invention can be similarly applied to various kinds of grains including barley and wheat, and various kinds of vegetables including root vegetables such as carrots, onions, and potatoes, as long as the growth stage can be determined from captured images of the portions of the crops exposed on the surface of the ground.

Additional advantages and modifications will readily occur to those skilled in the art. Therefore, the embodiment in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A server of a crop growth stage determination system, the server comprising a processor configured to:
    input first images obtained by image capturing crops in a manner such that crop shapes are extractable based on satisfying preset image-capturing conditions;
    input growth stages each indicating a level of physiological growth of the crops for each of the first images;
    construct a learned model by performing deep learning to associate images of the crops and growth stages of the crops based on the input first images and the input growth stage;
    input a second image obtained by image capturing crops a growth stage of which is unknown, in a manner such that crop-shapes are extractable based on satisfying the preset image-capturing conditions;
    determine the growth stage for the input second image based on the learned model; and output the determined growth stage,
    wherein the crops are paddy rice, and
    the processor performs deep learning to associate images, from which shapes of the paddy rice are extractable, with growth stages including panicle initiation, the panicle initiation being a time point at which differentiation of a young panicle wrapped in a leaf sheath starts.

2. The server of the crop growth stage determination system according to claim 1, wherein
    the processor excludes at least one of the input first image or the input second image that does not satisfy the preset image-capturing conditions.

3. The server of the crop growth stage determination system according to claim 1, wherein
    the processor inputs the first images for which each of an image capturing time period is restricted.

4. The server of the crop growth stage determination system according to claim 1, wherein
    the processor inputs at least one of the input first image or the input second image that is captured in accordance with an application program for displaying a guide for a composition of an image of crops to be captured.

5. The server of the crop growth stage determination system according to claim 1, wherein
    the processor divides the second image into a plurality of regions from which the crop shapes are individually extractable, determines the growth stage for each of the regions based on the learned model, and determines the growth stage of the second image from combined determination results of the regions.

6. The server of the crop growth stage determination system according to claim 5, wherein
    the processor sets a satisfaction criterion for the determination result of the divided regions, and determines the growth stage of the second image without including a determination result that does not meet the satisfaction criterion in the determination result of the regions.

7. The server of the crop growth stage determination system according to claim 1, wherein
the first images and the second image are gray-scale images.

8. The server of the crop growth stage determination system according to claim 1, the server further comprising:
a storage configured to store as a history record the growth stage determined by the processor,
wherein the processor outputs, based on the determined growth stage and the history record stored in the storage, at least one of the number of days that have passed in the determined growth stage, or the number of days that remain until a next growth stage.

9. A crop growth stage determination method, comprising:
inputting first images obtained by image capturing crops in a manner such that crop shapes are extractable are input based on satisfying preset image-capturing conditions;
inputting growth stages each indicating a level of physiological growth of the crops is input for each of the first images;
constructing a learned model by performing deep learning to associate images of the crops and growth stages of the crops based on the input first images and the input growth stage;
inputting a second image obtained by image capturing crops a growth stage of which is unknown, in a manner such that crop-shapes are extractable based on satisfying the preset image-capturing conditions:
determining the growth stage for the input second image based on the learned model; and
outputting the determined growth stag;
wherein the crops are paddy rice, and
the method includes performing deep learning to associate images, from which shapes of the paddy rice are extractable, with growth stages including panicle initiation, the panicle initiation being a time point at which differentiation of a young panicle wrapped in a leaf sheath starts.

10. A non-transitory storage medium storing a program implemented by a processor, the program causing the processor to:
input first images obtained by image capturing crops in a manner such that crop shapes are extractable are input based on satisfying preset image-capturing conditions;
input growth stages each indicating a level of physiological growth of the crops is input for each of the first images;
construct a learned model by performing deep learning to associate images of the crops and growth stages of the crops based on the input first images and the input growth stage;
input a second image obtained by image capturing crops a growth stage of which is unknown, in a manner such that crop-shapes are extractable based on satisfying the preset image-capturing conditions:
determine the growth stage for the input second image based on the learned model; and
output the determined growth stage;
wherein the crops are paddy rice, and
the processor performs deep learning to associate images, from which shapes of the paddy rice are extractable, with growth stages including panicle initiation, the panicle initiation being a time point at which differentiation of a young panicle wrapped in a leaf sheath starts.

* * * * *